(12) United States Patent
Nicholson et al.

(10) Patent No.: US 9,013,961 B1
(45) Date of Patent: Apr. 21, 2015

(54) APPARATUS AND METHOD OF REPELLING UNWANTED PESTS

(71) Applicants: William D. Nicholson, Waukesha, WI (US); Christopher Ehlers, Waukesha, WI (US)

(72) Inventors: William D. Nicholson, Waukesha, WI (US); Christopher Ehlers, Waukesha, WI (US)

(73) Assignee: William D. Nicholson, Waukesha, WI (US)

( * ) Notice: Subject to any disclaimer, the term of this patent is extended or adjusted under 35 U.S.C. 154(b) by 73 days.

(21) Appl. No.: 13/754,132

(22) Filed: Jan. 30, 2013

Related U.S. Application Data (60) Provisional application No. 61/607,074, filed on Mar. 6, 2012.

(51) Int. Cl.
*A01M 29/22* (2011.01)

(52) U.S. Cl.
CPC ........................................ *A01M 29/22* (2013.01)

(58) Field of Classification Search
CPC .............................. A01M 29/22; A01M 29/16
USPC .......................................................... 367/139
See application file for complete search history.

(56) References Cited

U.S. PATENT DOCUMENTS

| | | | |
|---|---|---|---|
| 4,097,838 A * | 6/1978 | Fiala | ............................. 367/139 |
| 4,219,884 A | 8/1980 | DeSantis | |
| 4,563,759 A | 1/1986 | Hayakawa | |
| 5,214,876 A | 6/1993 | Sukup | |
| 5,473,836 A | 12/1995 | Liu | |
| 5,528,049 A | 6/1996 | Callahan | |
| 5,602,523 A | 2/1997 | Turchioe et al. | |
| 6,104,283 A | 8/2000 | Otomo | |
| 6,581,324 B1 | 6/2003 | Creeger et al. | |
| 6,625,918 B2 | 9/2003 | Bhullar | |
| 6,710,705 B1 | 3/2004 | Smith et al. | |
| 6,718,681 B2 | 4/2004 | Bhullar | |
| 6,742,470 B2 | 6/2004 | Keithly | |
| 6,856,243 B2 | 2/2005 | Smith et al. | |
| 6,978,591 B2 | 12/2005 | Zehavi et al. | |
| 7,441,368 B1 | 10/2008 | Rieger | |

(Continued)

FOREIGN PATENT DOCUMENTS

| | | |
|---|---|---|
| JP | 2000-204684 | 7/2000 |
| JP | 2001-252002 | 9/2001 |
| JP | 2006-311255 | 11/2006 |
| WO | 2007/095693 | 8/2007 |

OTHER PUBLICATIONS

James, Kenneth R. et al; Mechanical Stability of Trees Under Dynamic Loads; American Journal of Botany; 93 (10); 2006; pp. 1522-1530.

(Continued)

*Primary Examiner* — Daniel Pihulic
(74) *Attorney, Agent, or Firm* — Andrus Intellectual Property Law, LLP (57) ABSTRACT

An apparatus for repelling pests includes a vibration generator operably connected to an object that operates in a first vibrating mode and a second non-vibrating mode. An environmental sensor senses a condition external to the vibration generator. A controller receives the sensed condition and controls the vibration generator between the first and second modes in response to the received sensed condition. Vibrations from the vibration generator are transferred to the object.

20 Claims, 10 Drawing Sheets

(56) References Cited

U.S. PATENT DOCUMENTS

| | | | |
|---|---|---|---|
| 7,450,473 | B1 | 11/2008 | Estrada |
| RE40,646 | E | 3/2009 | Nelson et al. |
| 7,598,879 | B2 | 10/2009 | Weiser et al. |
| 7,796,046 | B2 | 9/2010 | Weiser |
| 7,948,386 | B2 | 5/2011 | Weiser et al. |
| 8,084,968 | B2 | 12/2011 | Murray et al. |
| 2011/0235467 | A1* | 9/2011 | Bostick .................. 367/139 |
| 2012/0026839 | A1* | 2/2012 | Levine .................. 367/139 |
| 2012/0167826 | A1 | 7/2012 | Takanashi et al. |

OTHER PUBLICATIONS

Turpin, Tom; Do Insects Sleep or Are They Just Feigning It?; Purdue University, Education Department, Dec. 2004.
Sylvester, Brad; The Japanese Beetle: A Gardener's Reference; Aug. 4, 2008; http://sylvangardens.com/japanesebeetle/html.
McLauchlan, Brian S.; Vibration Measure & Control; TAFE Mechanical Engineering; 1990-2007.
English Abstract of JP2000-204684.
English Abstract of JP2001-252002.
English Abstract of JP2006-311255.

\* cited by examiner

APPARATUS AND METHOD OF REPELLING UNWANTED PESTS

CROSS REFERENCE TO RELATED APPLICATION

This application relates to and claims priority from U.S. Provisional Application Ser. No. 61/607,074 filed on Mar. 6, 2012, which is hereby incorporated by reference in its entirety.

FIELD OF THE INVENTION

The present disclosure is in the field of electro mechanical pest repellents.

Pests come in various types and sizes. Pests may include insects, animals, birds and in some cases children or people in unwanted areas of yards or houses or any other building. Fences, chemicals and other means used to control or kill pests are often dangerous or cumbersome to humans.

Today many new insects have invaded areas not formally inhabited by their species. Some US insects like Japanese beetles, Box Elders bugs, mosquitoes and ants are often difficult at best to control with pesticides. They have become a plague in many areas and are spreading rapidly. They often invade fruits and vegetable plants that are difficult to spray with chemicals, especially close to harvest time. Some insects often sit on the warm sides of houses or structures and plants and gravitate to warm openings in fall. With the advent and growth of organic gardening, pesticide use may be prevented all together.

Pests are not limited to insects. Chemicals may not be effective against some pests such as birds (robins) who eat cherries out of cherry trees as they ripen. Birds often find favorite places to perch that are destructive to the items being perched on. Destructive and dangerous places to perch include power lines and other places where the birds may interrupt service. Often birds leave fecal matter in all sorts of places where they perch that destroy the esthetic look of the place where perched. Some examples of common places soiled by birds include windows, doors, mail boxes, lights, landscaping lights, fences, antennas, cars, etc. Birds eat fish from Koi ponds. Dogs often wander into bushes and landscaping areas. Some animals like mice often find favorite hiding places or digging places near houses or other unwanted areas. Deer often jump over fences and eat various plants.

Many of these common pests have built in fight or flight mechanisms which are triggered by their sense of touch. Vibrations, transmitted through hands, feet, claws. Legs, antenna, air etc. are used to indicate a predator is nearby. These vibrations or movements often trigger the fight or flight mechanism in these pests.

BRIEF DISCLOSURE

The present disclosure is related to an apparatus and method to intelligently generate and control a mechanical vibration or sway in a surface or object to modify behavior of pests. An exemplary embodiment may be a stand-alone device that transfers movement and/or vibrations to a surface or object that is desired to be kept pest free. Other embodiments may adjust vibration or sway characteristics including, but not limited to, vibration amplitude in 1 or 3 axis of vibration, frequency, period, or vibration slope, vibration acceleration, direction of applied vibration (force), sway, and/or resonant/optimum frequency.

In exemplary embodiments, the force vectors may be directional and therefore can be made more effective when the axis of the generated vibration is modified or optimized.

In a non-limiting embodiment used in connection with a tree branch, tree branches may act as dampeners. When vibrations are applied down a branch, the branch begins to sway as the dampening anchors of the tree roots have less effect on outward branches. Non-limiting embodiments may include vibration feedback monitoring, making it possible to consider and adjust both the branch sway and the resonant point at which vibrations are maximized.

Embodiments disclosed herein adjust additional characteristics of vibration of a surface or object, and an impart sway on some surfaces or objects.

Embodiments as disclosed herein may monitor parameters related to the vibration of sway of the object or surface in real time to provide automatic corrective action to a vibration signal.

Embodiments as disclosed herein may further monitor many other parameters including, but not limited to, date, time, season, weather, temperature or ambient light and provide automatic corrective or alternative action to the vibration and sway characteristics. This enables the device to compensate, alter, proportion or eliminate vibrations based on the parameters.

Exemplary embodiments may be used on advanced methods as disclosed herein of determining when vibration is to be applied to an object or surface. In a non-limiting example, a device might vibrate for 5 seconds and then the next vibration is actually determined by the next time temperature passes a certain set point. In addition to being used for compensation purposes, parameters may be used to advance to the next vibration stage rather than time.

DETAILED DESCRIPTION

Figure 1:
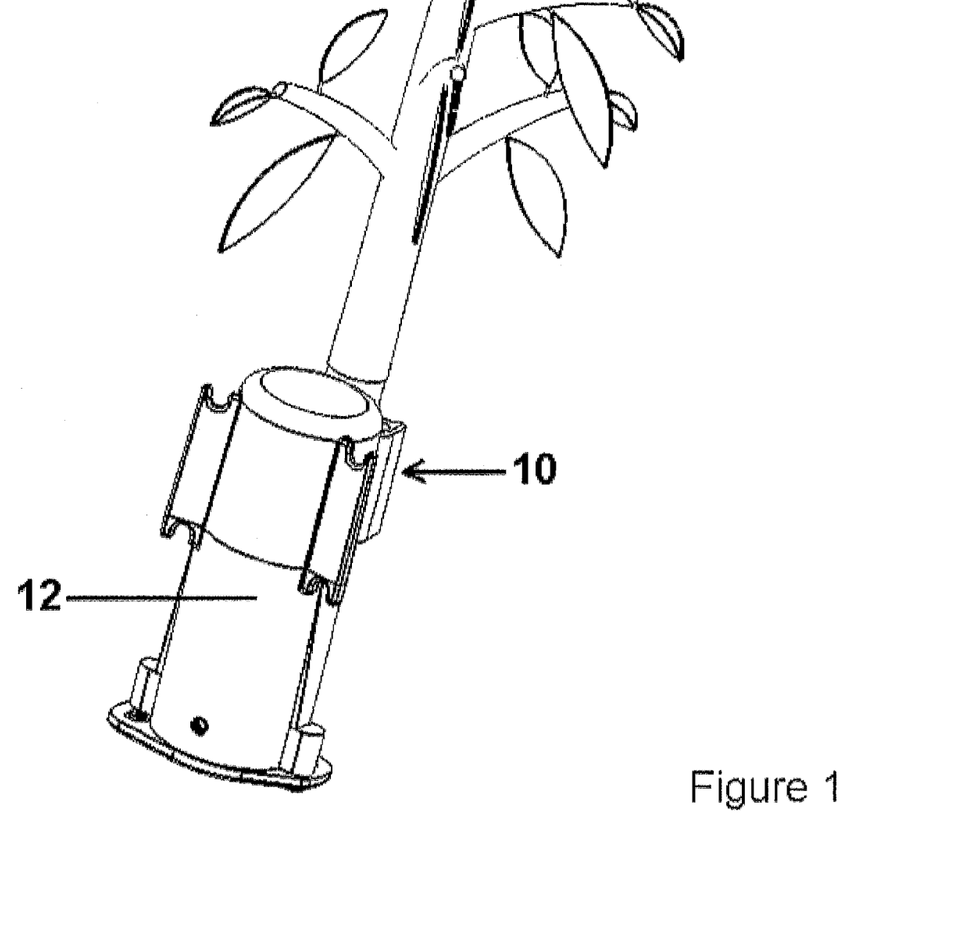
FIG. 1 is an environmental view of an embodiment of the apparatus.
Figure 4:
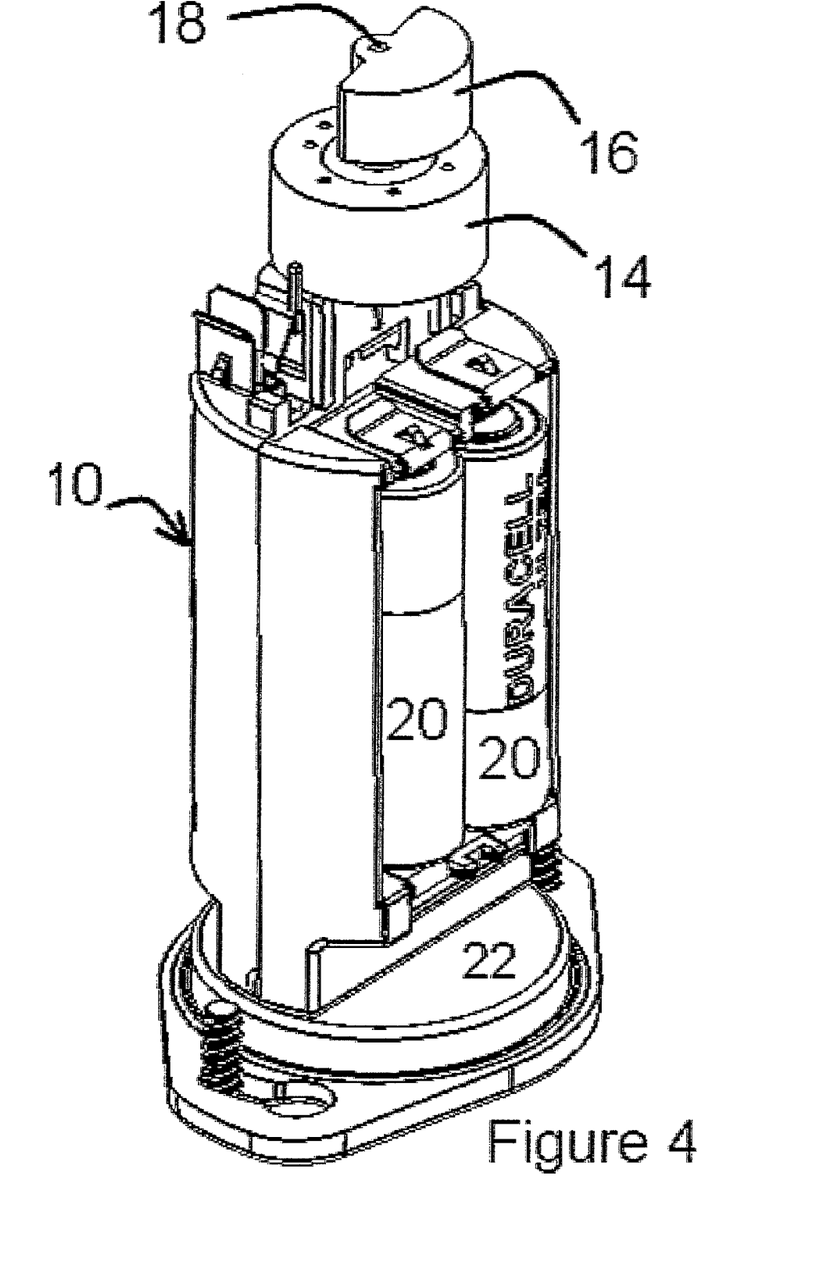
FIG. 4 is a perspective view of an embodiment of the apparatus.

FIG. 1 shows one embodiment of an apparatus 10 for repelling pests from an object, such as a tree. As used herein, the term object may refer to an entire object, or a targeted portion of an object, such as a specific surface. An embodiment of the apparatus may exemplarily be used to repel Japanese beetles from Fruit trees. While Japanese Beetles are exemplarily used in the description of this embodiment, the operating software enables many different profiles to be generated easily changing the same device to repel virtually any pest. The apparatus 10 includes an outside case 12 that is environmentally resistant. FIG. 4 depicts an embodiment of the apparatus 10 with the outside case 12 removed. The apparatus 10 includes an electromechanical motor 14 with an eccentric weight 16 mounted on a shaft 18. The motor, internal to the device, rotates the shaft 18 and weight 16 which causes the device to vibrate. The motor 14 is exemplarily powered by batteries 20. The batteries are connected to a circuit board. The circuit board 22 is depicted in schematic form in FIG. 5 and includes a microcontroller (CPU) 24 used to control various characteristics of the vibrations and sway imparted on an object or surface as disclosed herein and sends control signals to the vibration generator 26 to control the operation of the motor. By sending a voltage to the motor, the amplitude, frequency and direction of vibration may be controlled. Also present on the circuit board is flash memory 28 capable of holding operating software executed by the CPU 24. Some embodiments of the vibration generator circuitry 26 may utilize analog or digital control circuitry to control vibrations and sway. Vibration and sway are controlled to optimize to control various pests, surfaces, and installations.

While the embodiment described herein utilizes a vibration motor 14 shown in FIG. 4, other electromechanical vibration and movement generation devices may be used to carry out the sway, vibration and directional features disclosed herein. Other embodiments might uses pulses of water, pulses of air, or other methods to impart vibration, directional movements, movement, or sway in a surface. In a still further embodiment, the vibration generation device is configured to input vibration or movement onto a body of water.

Embodiments disclosed herein may be used in combination or integrally combined with other existing objects. An example that utilizes that embodiment might include a mailbox with vibrating mechanism that vibrates when touched in order to keep birds from defecating. Another embodiment incorporates a vibrating mechanism incorporated into common landscaping lights to keep birds from defecating by sensing the vibrations from a bird landing on the light using an accelerometer. Advanced embodiments may take advantage that the vibration caused by an animal moving actually causes the motor to rotate slightly causing the motor to act briefly as a generator and an advanced controller detects the generated voltage from the mechanical motion to sense movement. Other embodiments would incorporate the device into common materials used in construction or housing (windows, doors, and siding) to repel harmful or annoying pests.

Referring back to FIG. 1, the outside case in the embodiment incorporates a plastic housing designed to protect the other components (e.g. FIG. 4) from dust and water penetration. The vibration mechanism in this embodiment is connected to the housing directly using mounting fingers. The case is designed to enable the end user to change the batteries when required while still maintaining a water tight seal by the use of an O-ring in this embodiment.

Figure 2:
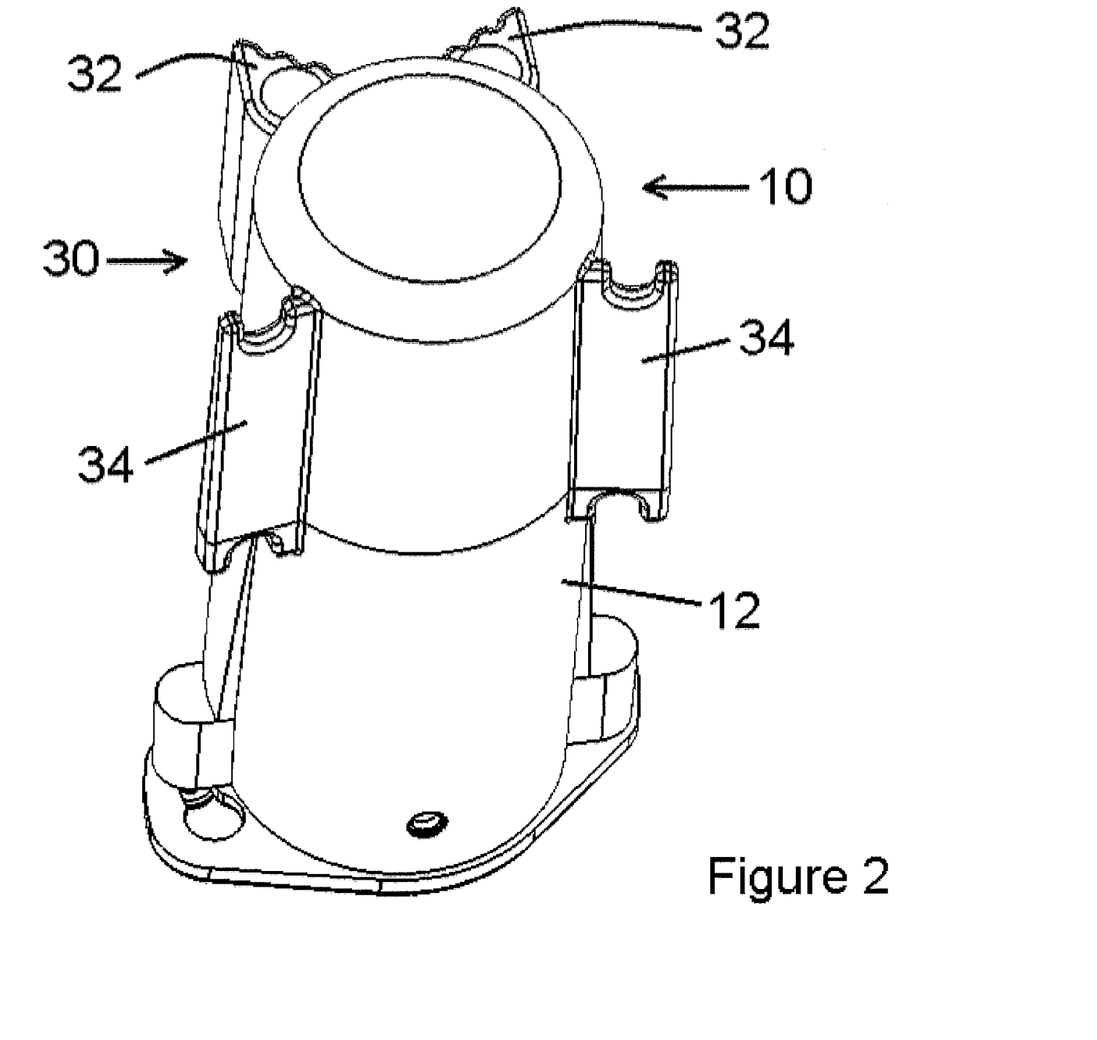
FIG. 2 is a front perspective view of an embodiment of the apparatus.

FIG. 2 shows an embodiment of a coupling mechanism 30 configured to secure the apparatus 10 to a surface of object to which the vibration or sway is to be imparted. The coupling mechanism 30 may be external to the device such as simple clamps, wire, strings, etc. In FIG. 2, the coupling mechanism incorporates a curved shape defined by a pair of opposing arms 32 which are designed to transfer vibrations to a tree or plant or building material. The device is then held tightly to the tree or branch by one or many straps (not depicted). In one embodiment, EPDM bands (not depicted) are secured between opposed tabs 34 to hold the device to a tree or bush. The curve defined by the arms 32 of this device enables the device to hold tightly to the tree conforming to the curved surface of the tree. When the device begins to vibrate, these vibrations are imparted to the tree and pests on the tree such as Japanese beetles or birds will begin to flee. The vibrations are altered to enable the variations to surprise pests or to keep them from adjusting to the vibrations. In large scale applications such as orchards where many trees are connected via wire or staked, the coupling mechanism may be orchard wire used for staking the trees where the coupling mechanism is designed to attach directly to the tree or wire. In that embodiment, the device may be one or many vibration generators operating stand alone or may be a large scale motor attached to a cable or other method of attaching one large vibration to many surfaces or plants. In any embodiment, vibration characteristics may be controlled to keep fruit or vegetables from dropping off plants. Feedback control of the generated vibrations as described herein are important to that application utilizing various methods of feedback including motor voltage, light, temperature and accelerometer readings in an embodiment. Other embodiments include coupling mechanisms incorporated into the design of nets and fences to enhance their ability to keep out pests such as bugs or deer. In water applications, embodiments may include coupling mechanisms for transfer of vibration or movement in landscaping and Koi ponds or other water to keep out birds from eating fish and mosquitoes from hatching. Other water applications include an embodiment where the operable coupling of vibrations to the object include a floating apparatus designed to transfer vibrations to the water the apparatus is floating in. The application for this floating mechanism would be to keep mosquitoes from laying eggs in water.

Figure 3:
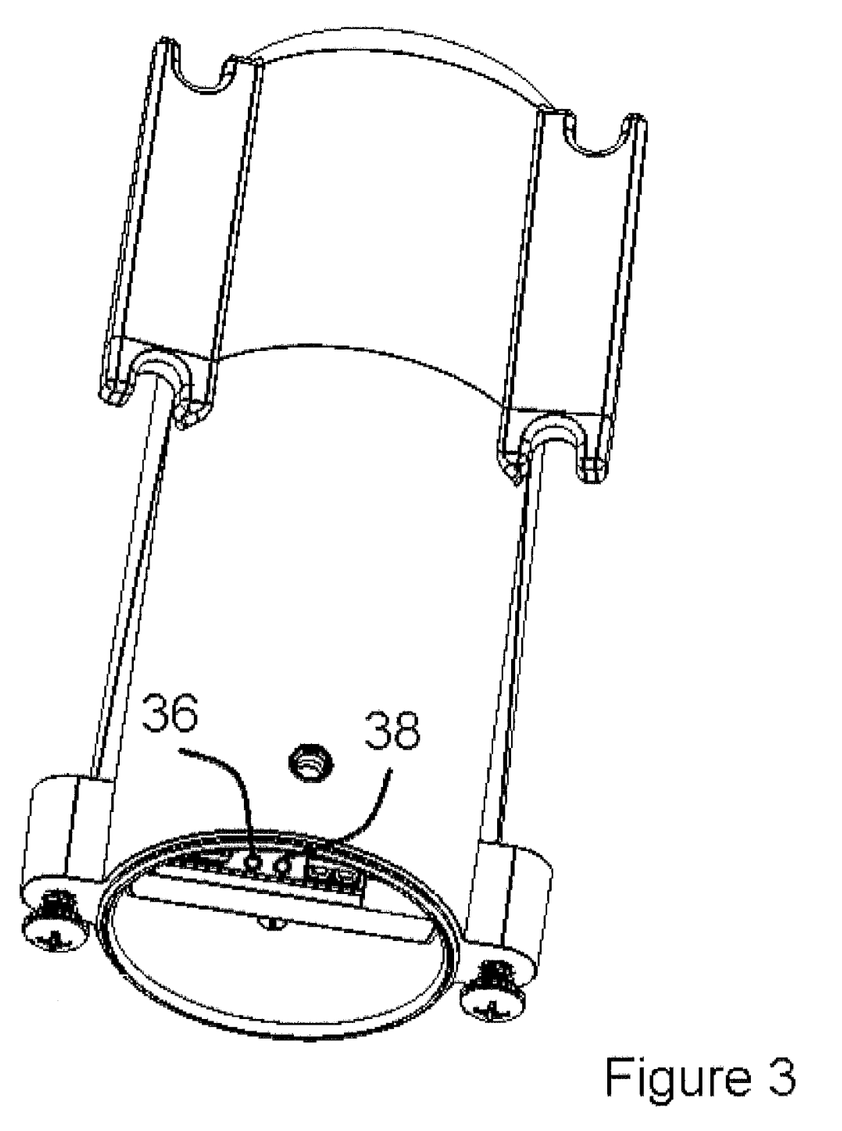
FIG. 3 is a bottom perspective view of an embodiment of the apparatus.

FIG. 3 shows a light sensor 36 and LED 38. In this embodiment, the LED is used as a basic output device to indicate when power is low on the device or when the device is vibrating or can be used as another action. Some embodiments may incorporate other methods of user interface. FIG. 3 also demonstrates how this embodiment incorporates an ambient or artificial light sensor 36. In this embodiment, the light sensor 36 is used to monitor light used to determine vibration characteristics. Some pests, such as Japanese beetles are more apt to move in the daylight or bright sunny days. Vibration in certain light levels enables the device to operate more efficiently at the time when pests are active and conserves battery for the device to last longer. Pest like fruit rats, are typically nocturnal and therefore the device may utilize the light sensor to determine to vibrate at night or just before dusk for example. Embodiments may use many different input sensors to help determine and control the characteristics of vibration. Some common sensors used in embodiments to monitor and control characteristics of vibration include temperature, light, humidity, vibration, location, current, voltage, water, level, acceleration, pressure, barometric pressure, chemical presence, proximity, flow, sound, etc. Other vibration characteristic parameters which may be used to help control vibration characteristics include date, time, counts, external synch signals, etc. Advanced embodiments may use wireless signals or data such as temperature for an area from the internet which triggers vibrations.

The information provided to the CPU (not depicted) from these environmental sensors enable more advanced control of the motor and eccentric weight than a simple on/off switch control would. Embodiments of this device incorporate a sensor or parameter to control the characteristics of vibrations or to start and stop modes of vibration. Embodiments may also include an ability to respond to the parameters listed along with the ability to control a series of vibration events in response to at least one sensed environmental parameter. By using an advanced microcontroller with flash memory, a variety of parameters may trigger the modes of vibration or compensate the level of vibrations.

FIG. 4 shows the batteries 20 and vibrating DC motor 14. An exemplary embodiment utilizes 4 AA batteries as a source of power to power the electromechanical motor 14 which rotates the eccentric weight 16 to generate the vibrations. Various embodiments to power the vibration generator may include batteries, AC power, DC power, Solar Power, Wind, Pressure (such as water or air pressure), etc. This embodiment of the device also includes a connector so that the device may be powered and/or and controlled by an external device such as AC power or large battery or external controller. This allows the interconnection of many devices. Other embodiments may use wireless technology to control multiple devices or to interface the device to the outside world.

Various techniques in the embodiments to conserve power for battery operation may be employed. This first technique used in this embodiment is Pulse width modulation. The enables the vibration generator to operate off of rated battery voltage and thus get maximum vibrations. It also enables the generator to operate at less than its rating to reduce power consumption and control vibration level. Reduction of the control signal enables lesser vibrations to adjust for other pests and conditions. The second technique employed here to conserve power is to turn the motor on and off thus maximizing torque at startup yet minimizing average drain on the battery when off. Software and hardware controlled profiles regulate power consumption. Battery monitoring circuitry is also employed to regulate power consumption providing feedback. Power conservation also employs the use of standby or sleep modes of the microcontroller to keep some operating circuitry powered but in very low standby current mode when the device is not vibrating. The light sensor is used to control profile steps for operation only at night or day or in sunny or cloudy conditions. This maximizes effectiveness and yet at the same time, it manages power consumption.

This embodiment utilizes a voltage regulator and switching circuit to apply voltage to the motor. This voltage is limited to not exceed rated voltage of the motor.

The main control board has an external connector in this embodiment. This connector is used to power and control the device for applications where the application desires longer term operation than can be achieved using the on board batteries. An item such as a large battery may then be operatively coupled to many devices to operate a network of devices. These devices may then be controlled by the internal control board or controlled by an external source. They may also be powered by the internal source or by the external source. Other embodiments consist of a controller which controls many of the devices but with the same functions built into this embodiment of the controller.

FIG. 4 shows the vibration generator including eccentric weight 16 and DC motor 14 in this embodiment. This vibration generator 16 is moved by a DC motor 14. This motor, when energized, spins an eccentric weight 16 on a shaft 18 to generate vibrations. The eccentric weight 18 induces a vibration once in each revolution (Once or once per cycle). By using a bidirectional motor and an Hbridge circuit which allows the polarity of the applied voltage to change in this embodiment, the motor direction and the applied direction of vibrations can change. This provides for directional control, and provides the embodiment to control sway. In addition periods of vibration in one direction, then the opposite direction allow the embodiment to maximize its effectiveness.

Other embodiments used to generate movement might utilize AC motors, Weights which drop utilizing gravity to generate movement, devices which tap, moving air, wind to generate vibrations, devices which pull or push on surfaces, and water pulses to generate vibrations.

The vibration generator is controlled by a microcontroller 24 (FIG. 5) and vibrates with characteristics determined by the circuit board 22 which contains the control circuitry. In this embodiment, the DC motor is connected to the controller via a trace on the PCB which connects to the wires of the motor. The controller sends a pulse width modulated voltage control signal to the motor. The pulse width modulation frequency is then adjusted to affect the average DC voltage to the motor thus regulating motor speed. This enables the circuitry to control the voltage, current of the motor thus controlling amplitude and frequency of the vibrations (the vibration characteristics). The applied voltage to the motor is controlled by an Hbridge circuit enabling motor polarity of the motor to change.

Figure 5:
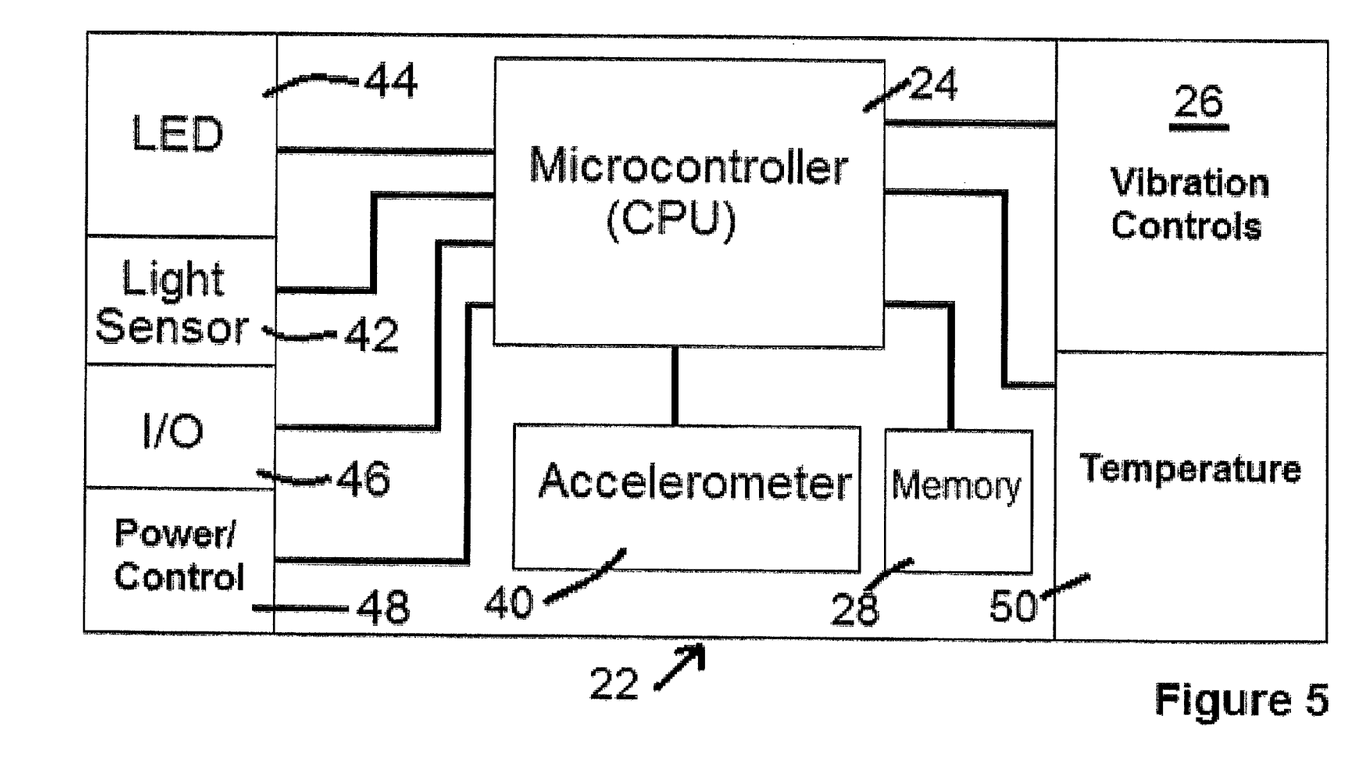
FIG. 5 is a system diagram of an embodiment of a controller as may be used with the apparatus as disclosed herein.

FIG. 5 shows the main controller board of the device. In the embodiment shown, the main controller board 22 includes: a microcontroller (CPU) 24, memory 28 (which may be flash memory), an accelerometer 40, a light sensor 42, at least one LED 44, analog and/or digital input/output and/or wireless and/or wired interface 46, power/control 48, vibration control circuitry 26, and a temperature sensor 50.

In this embodiment, the main controller board 22 utilizes a microcontroller 24 with operating software that is stored in flash memory 28 in this embodiment. This flash memory 28 is also used to hold various setting or values for controlling vibration parameters. Flash program memory 28 may be complemented by flash data memory 28 to allow for storage of user generated operating profiles. Flash program memory may also be incorporated directly into the microcontroller. The microcontroller 24 has external connection ability through the I/O 46 to allow for the operating system or other software or firmware to be changed or updated. In this embodiment that circuitry includes a USB interface. The microcontroller 24 may include very low power operating modes to enable very low power operation at all times to conserve power. The microcontroller 24 executes computer readable programs or code to carry out the software functions shown in the flow charts of FIG. 6A-E to control all aspects of operation. Other embodiments would utilize a controller board and more traditional circuitry without the microcontroller capabilities. Simple embodiments may use simpler circuits and/or mechanical means to control operations This embodiment incorporates an accelerometer 40. This enables the apparatus to measure the vibrations imparted to the object or surface to enable corrective action. The accelerometer measures acceleration in the X, Y, and Z plains. This feedback is used to calibrate the apparatus to its surroundings and also to make corrective action. This accelerometer may also be used as a trigger as to when to vibrate and if to vibrate. In extensive monitoring of some pests they do not move or do no come out during windy conditions. The software executed by the CPU can use this signal to change operation if windy conditions are detected or if pest-caused vibrations are detected. Since the apparatus is secured to the object or surface, the accelerometer measures the movement (vibration or sway) of the surface or object rather than the operation of the vibration generator. This enables corrective action in response to measurements to operate the vibration generator to create a targeted vibration or sway on the surface or object. Other methods of getting feedback are to monitor the motor current and/or voltage in this embodiment. All devices known to this inventor vibrate at an expected level but do not incorporate feed-back to verify that the imparted vibration occurs at the expected. The use of feedback of the accelerometer and other feedback signals such as light give this invention the ability to provide a continuously changing vibration based on feedback. The accelerometer may detect movement and thus vibrate when the plant or object it touched by a pest. Embodiments may incorporate other methods of detecting movement of the surface that is being vibrated or moved.

Embodiments incorporate light measurement utilizing a light sensor 42. An embodiment may incorporate solar power but this solar power not be adequate for control of operation based on lighting conditions. The light sensor 42 provides the apparatus with the ability to compensate, alter, proportion or eliminate the characteristics of vibration and sway based on light conditions. For example, cloudy days, sunny days or even just a slight change in weather may be used as trigger points. In addition, the vibration level may be continuously adjusted and compensated for based on light level vibrating harder during times when pests are active.

Embodiments may use a variety of parameters in addition to light for adjustment of the vibration characteristics. Embodiments could include but not be limited to temperature, light, humidity, vibration, location, current, voltage, water, level, acceleration, pressure, barometric pressure, chemical presence, proximity, flow, sound, clock, time, date, synch pulse, switch input, or any other external or internal signal.

The LED 44 shown in FIG. 3 in this embodiment is utilized to provide some feedback to the user of proper operation. Other embodiments may utilize a variety of user interface techniques or no user interface at all may be employed. This embodiment also employs a push button switch used to gather user input and a USB port or other connection type to exchange information with an end user. In this embodiment, the switch is used to advance from one profile to the next. PCs, internet, cell phones, smart phones, and other computing devices may be used in other embodiments to interface to the invention in any embodiment for various purposes.

This embodiment is equipped with digital inputs and outputs 46 and Power/Control 48 and this is used to enable the device to respond to external inputs and/or control another device. This enables responses to events and feedback signals for various purposes. The outputs enable the device to respond in other ways other than vibration. Other embodiments may use any type of Input and output to provide this compensation and control.

The power/control 48 section in this embodiment is used to enable external control of the device to enable devices to operate in synch or out of synch. It is also used to enable external AC/DC or any other type of power to be supplied to this device. Embodiments may use various forms of control and power.

This embodiment utilizes a vibration generator control circuit 26 that uses Pulse Width Modulation (PWM) to control various aspects of the vibrations by using the PWM signal to regulate average DC voltage to the vibration motor in this embodiment; any level of vibration may be set with one control signal at any instant. Feedback in incorporated so vibrations no longer simply consist of a series of on off cycles in a certain range of amplitude and frequency. Fine PWM vibration control is also be used to control battery consumption.

In an embodiment, a four transistor H-bridge circuit is used to control the direction of rotation of the vibration motor. This gives this embodiment the ability to control the direction of the vibration force applied. This provides directional vibration control and the ability to impart sway in some surfaces.

This embodiment incorporates temperature measurement utilizing a temperature measurement sensor 50. Temperature may be used to compensate or determine the occurrence of a vibration signal. This provides the apparatus with the ability to compensate, alter, proportion or eliminate the characteristics of vibration and sway based on parameters. Extensive studies on beetle and box elder infestations indicated that cold temperatures often caused these populations to become lethargic. Vibrating when it was cold actually can cause pests to become latched on to plants.

Upon power up, the microcontroller loads the operating software and begins the operating sequence. An operational flow chart depicting an embodiment of a method 100 of repelling pests is shown in FIGS. 6A-6E. During operation, the microcontroller operates through a profile comprising at least one, but preferably multiple stages. Embodiments may have one profile or may have many profiles. These operating profiles give the invention an infinite variety of adjustments. Profiles are setup in advance and are downloaded into the device via a USB port into memory. With flash memory, a variety of methods may be employed to configure operating profiles and stages. By using a PC or the internet or other means of communication, an embodiment will enable users to create their own profile and stages and download profiles into the device to change its performance.

Each profile stage has individual settings for characteristics of vibration, interrupt settings to advance to the next stage, and compensations for the current stage.

During many stages, the software operates in standby mode waiting to be woken up by next interrupt. With the extensive use of interrupts, many more extensive environmental/other signals are used to determine when to vibrate next. This provides for a much greater ability to fend off pests. For this embodiment, Japanese beetles have been studied extensively. Their habits prove that they often move much slower if at all when there is less sunlight. Using this method, the device may only vibrate when the sun is out and at a certain Lux level. Using a profile stage, the device may also only vibrate when its dark giving the user total control of the operating stages. This provides for total randomness for the timing and amplitude of the vibrations with respect to time, instead relying on the strength of the sun to determine when to vibrate.

Figure 6A:
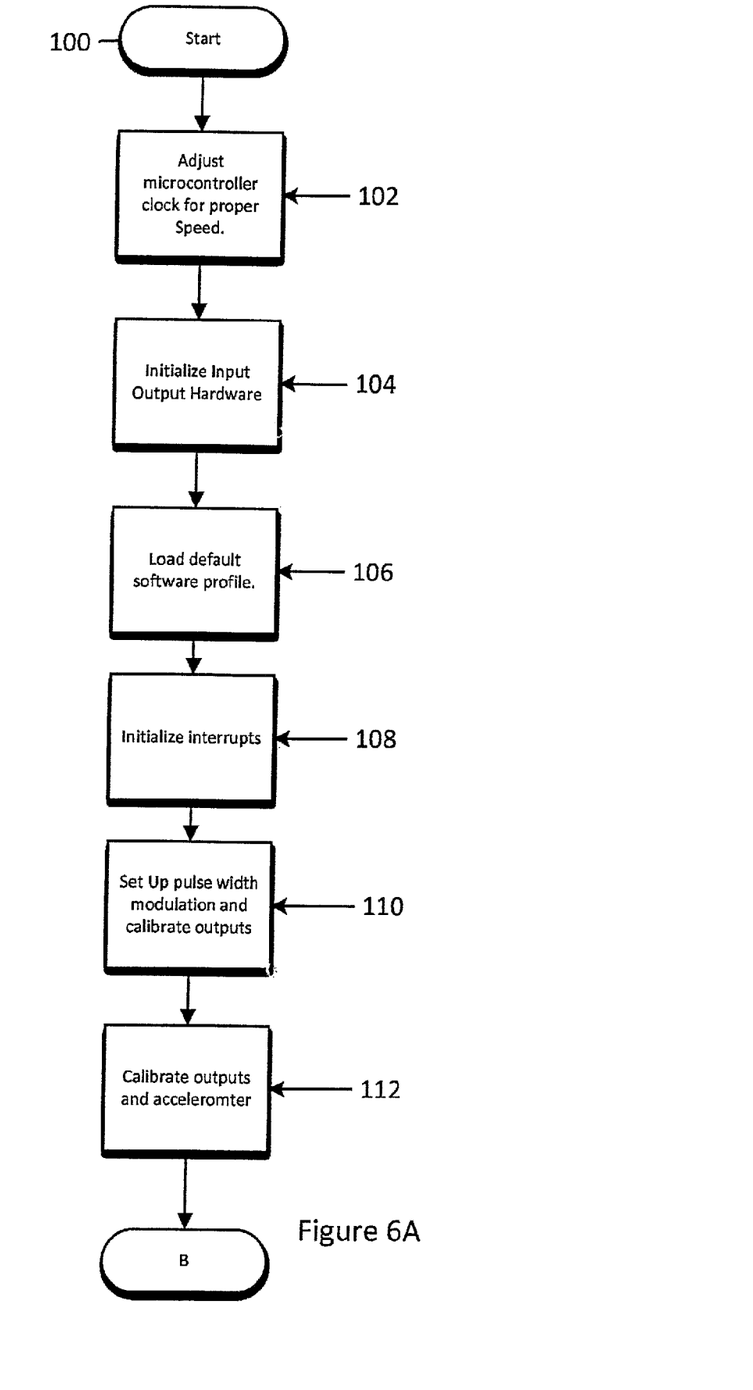
FIGS. 6A-E are flow charts that depict a method of operation of an embodiment of the apparatus.

In FIG. 6A, the software begins operation and sets up all operating hardware to the proper operating parameters for the microcontroller and hardware. In the steps 102-112, the motor pulse width parameters are setup. This includes adjusting the microcontroller clock for proper speed 102, initializing input and output hardware 104, loading a default software profile 106, initializing interrupts 108, and setting up pulse width modulation 110. Also, the outputs and accelerometer are calibrated as necessary at 112.

During this stage, this embodiment can go through a cycle where a slowly increasing vibration signal is applied. The software utilizes the accelerometer to measure the response. In this embodiment, the invention is coupled directly to the surface and therefore the surface dampens the vibrations generated by the device thus changing the desired characteristics of vibration of the surface. Feedback is then used to compensate, alter, proportion or eliminate the vibration and sway characteristics. Utilizing this method, the surface the device is mounted to may be desired to a certain level rather than just vibrating the device at a certain level. Other embodiments may utilize a sensor that is not mounted directly to the device itself to sense vibrations. The connection to the sensor in that embodiment may be a wire or may be wireless.

Figure 6B:
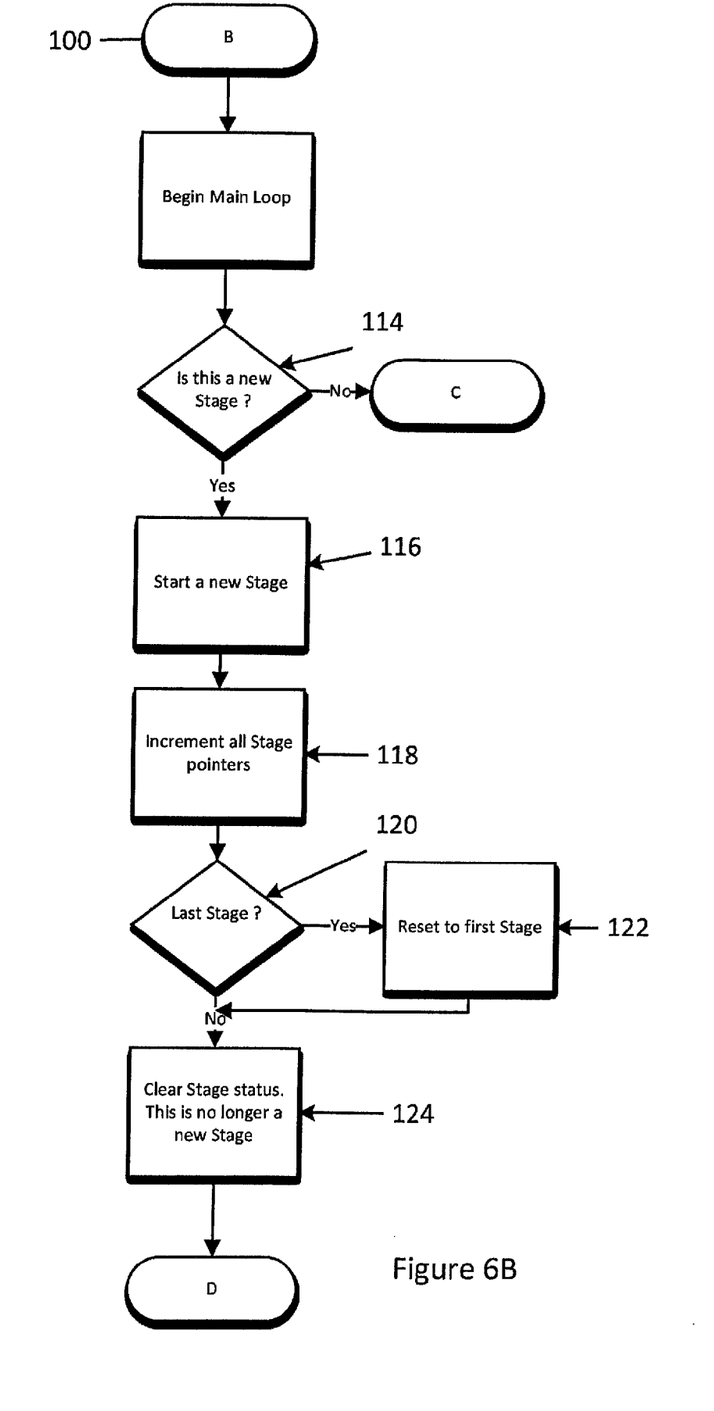

Once the setup and self-calibration are complete, the software continues on at FIG. 6B. At this point, a next stage of the profile is selected. In this embodiment, the stage can have a variety of compensations and triggers. In order to determine if vibration is necessary, a variety of sensors and parameters may be checked. These parameters are configured in each operating profile in flash memory. Light, time since last vibration, date, internal battery voltage, external battery voltage, temperature, accelerometer, and external input may all be configured in a stage to determine when to vibrate. The vibration profile therefore that follows is dependent upon external sensed parameter rates than a time sequence to determine a next vibration profile.

At 114 a determination is made if a new stage or current stage is occurring. If it is a new stage, then the stage number in the profile is determined at steps 114-124. These steps include starting a new stage 116, incrementing stage pointers 118, determining if this is the last stage at 120, if the stage is the last stage, resetting to the first stage at 122, and clearing the stage status starts at 124.

Figure 6C:
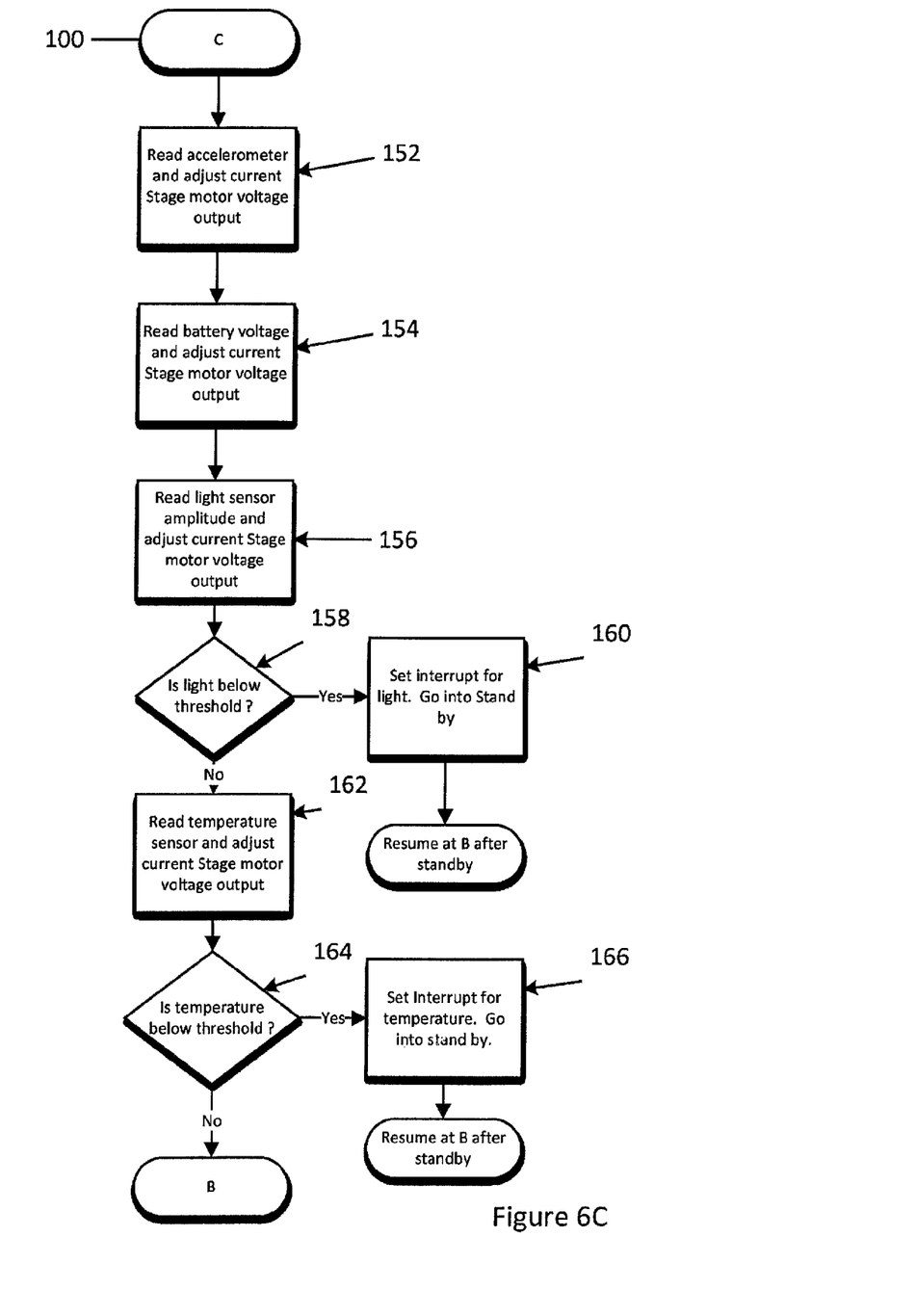
Figure 6D:
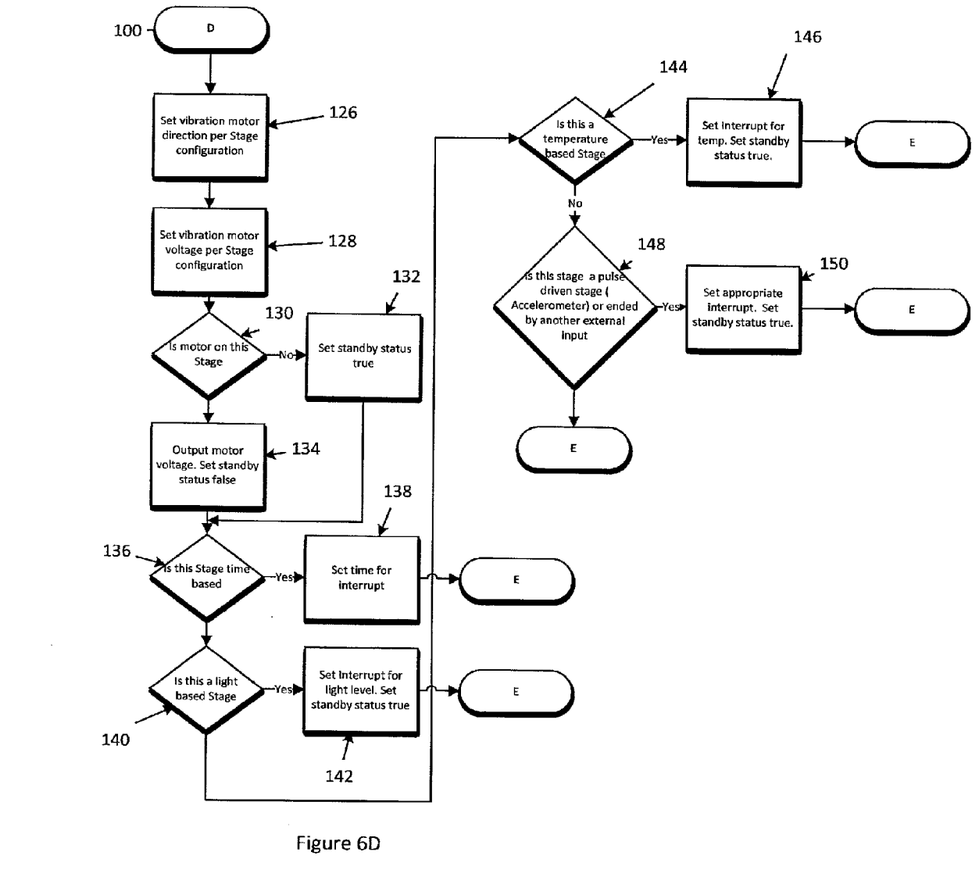

Once the appropriate stage number is determined, the software sets the vibration level output as shown in FIG. 6D. Once the appropriate vibration level is set, the software then determines if it should set the interrupts and go into standby mode. Extensive use of standby mode is used to conserve power and to control the next stage occurrence.

As shown in FIG. 6D, the operation of the motor and establishment of standby mode is carried out by setting the vibration motor direction in accordance with the stage configuration in the profile at 126, setting the vibration motor voltage in accordance with the stage configuration of the profile at 128. At 130 confirmation that the motor is on the appropriate stage is made. If this is true, then the motor voltage is output to the motor and the standby status is set to false at 134. If the motor is not on in the stage at 130, then the standby status is set to true at 132. At 136 a determination is made if the stage is time based in the profile. If the stage is time base, then at 138 a time is set for the interrupt. If the stage is not time based at 136, then a determination is made if the stage is light based at 140. If the stage is light based at 140, then an interrupt is set at 142 dependent upon a light level and the standby status is set to true.

Rather than use standby mode, the software may also stay operating as the profile has a series of possible types of control and compensations that it may utilize while vibrating. Control parameters may include target output signal, mounting correction factor, sway, acceleration, time, temperature correction factor, light correction factor, direction, and power correction factor. The path shown in FIG. 6C shows the compensation steps that may operate within a stage of the profile on a current vibration signal for compensation of that signal. Such compensation may be made to achieve a target vibration or sway in the object or surface as determined by the accelerometer. These compensations are implemented using a formula in this embodiment. For example, if the desired voltage to apply to the vibration motor is 5 volts and the battery is currently measured to be 6 volts, the output is turned on at 83%. When battery voltage discharges to 5.5 volts, the output signal is adjusted to 91% to keep the same level of output.

The compensation in steps of FIG. 6C may be made by reading the accelerometer and adjusting the voltage output sent to the motor for the stage at 152. Next, a battery voltage may be read and the voltage output may be adjusted based upon the battery voltage at 154. At 156, a light sensor value may be read and the voltage to the motor is adjusted for the stage based upon the light sensor reading. It is to be understood that in embodiments, one or more of compensations shown in 152, 154, and 156 may be used in order to adjust the operation of the motor in the current stage. Other compensations may also be used. At 158 a determination is made if the light sensed by the light sensor is below a predetermined threshold. If the light is below the threshold, then an interrupt is set for light and operation moves to standby mode at 170. If the measured light is above the predetermined threshold, then operation continues and a temperature sensor is read and the voltage to the motor may be adjusted for the current stage at 162. At 164 a determination is made if the temperature read at 162 is below a predetermined threshold. If the measured temperature is below the predetermined threshold then at 166 an interrupt is set due to temperature and the system operates in standby mode until a certain temperature is set.

Figure 6E:
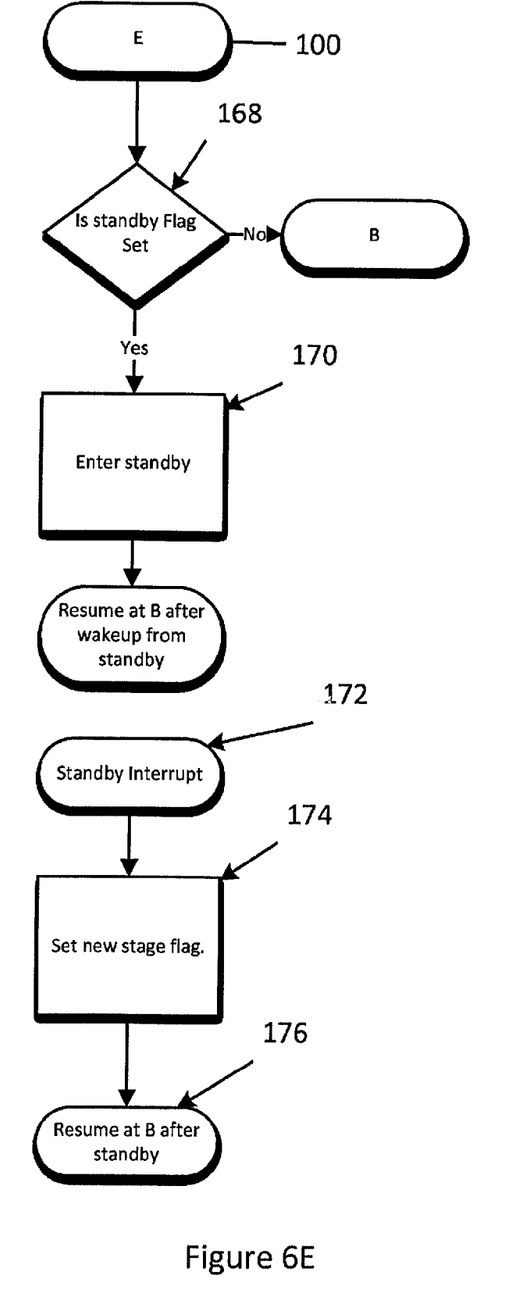

Profile actions may not include vibrating at all for a particular step. For example, in many hours of observing the behavior of Japanese beetle infestations, it is not advantageous to vibrate at low light levels. For this, the profile stage would set an interrupt to wake out of standby when a desired LUX level is achieved. Standby mode is set as shown in FIG. 6E. Upon waking from standby, the software resumes at step B with a new stage.

The establishment of standby mode as shown in the embodiment of FIG. 6E may begin by determining if a standby flag is set at 168 such as from a determination made in accordance with the steps of FIG. 6D. If a standby flag has been set, then at 170, the system enters standby mode. The software then stops executing waiting for an interrupt to resume operation. If standby is interrupted at 172 then the system cycles to the new stage in the profile at 174 and the method resumes at FIG. 6B at 176.

Action in any stage may simply be to flash the LED or turn on or off a control output. Embodiments would include control outputs triggered by the profile steps.

Through a series of experiments in control in addition to vibration, this embodiment is able to control sway. Observations show some pests became accustom to simple vibrations. Therefore utilizing this embodiment's centrifugal force, the invention was able to impart movement. With movement, the physiological response from pests may change. The sway is achieved with short varying profile steps, alternating the vibration direction using the H-bridge circuit resulting in considerable back and forth movement. Because of the unlimited number of profile stages, the vibration characteristics may be altered extensively and any type of movement may be generated. Other embodiments may use other means to generate movement.

A profile may have any number of steps and once the last step is reached, the profile resets to the first step. At the first step, operation restarts at FIG. 6B.

Currently many different devices exist which vibrate for various purposes. These devices include pest repellents, toys, cell phones, video game controllers, pagers and human gratification devices. For generating vibrations, these devices may generate vibrations at various amplitudes and in various frequency spectrums. These devices are tuned for specific responses by humans, insects, and animals. These devices only utilize methods which incorporate preplanned or random amplitude and frequency. This severely limits the effectiveness of such devices. They do not consider that vibration forces can be much more effective for eliciting a response in different species when considering X, Y and Z vibration components, direction of applied vibrations (forces), rate of change of vibrations, acceleration of vibrations, sway, and resonant frequency(s) (vibration characteristics).

Some devices vibrate sometimes two or more times or randomly as well. They typically lack the intelligent control found in a microcomputer based controlled system where control is not simply turning on and off twice or more. More importantly, these devices only base the occurrence of their next vibration step on waiting an elapsed time.

While some devices propose to have vibration characteristics tuned for certain pest behaviors, further limiting these devices is the lack of feedback system that allows the device to change or optimize the vibration characteristics. All known devices actually vibrate the device at a certain desired amplitude and or frequency with possibly a desired target in mind.

These targets are typically obtained before the device is installed through scientific observation. A device may desire to elicit a preset certain amplitude or other characteristic of vibration to control pest behavior in a certain range but does not achieve the desired range when the vibration is generated. An example of the difficulty in vibrating a surface at known amplitude would be to consider a vibration device coupled to a concrete wall. It is desired to vibrate the wall at a certain amplitude or frequency. Once the device is attached to the wall the amplitude may not be adequate to achieve a vibration level and also will differ if coupled to a different type material or an even a different density concrete. Each material has certain stiffness and surroundings may absorb vibrations. In reality, to the best knowledge of this inventor, all pest control devices actually vibrate the device at a desired frequency or amplitude. They do not actually vibrate a surface they are seeking to vibrate at the known value because the surface to be vibrated absorbs vibrations thus changing the amplitude of vibration.

Pest control and other devices attempt to elicit a certain behavior using vibrations with certain assumptions or laboratory measurements of the behavior of a species in reaction to the vibration amplitude or frequency. These devices do not take into consideration that many environmental conditions will affect a species response to vibrations. For example, Animals, insects, humans and other species become lethargic when cold or at night/day and thus change their behavior and response to vibration or other stimulus. Current devices typically lack the ability to alter the desired vibrations to match the changes in a pest response to those vibrations due to environmental changes.

Embodiments as disclosed incorporate an accelerometer or other parameters to control or optimize the vibration or sway characteristics which may be the result of the vibration generator.

Embodiments as disclosed incorporate feedback of vibration and sway related parameters to enable corrective action to the desired results. Embodiments further consider additional parameters which may be used for corrective action.

Embodiments as disclosed further consider and control of different vibration characteristics. In embodiments, vibrations are not simply one or two or more because vibrations are not strictly time based or period based. Always vibrating two or more neglects the effect of surprise by periods of non-vibration. Devices which vibrate one or more or two or more times simply rely on time or counts to determine when to vibrate the next time rather than rely on other parameters to determine the next time to vibrate. Embodiments may incorporate feedback of the vibration and sway characteristics to enable corrective action to achieve desired or optimum results and additional parameters which may be used for corrective action and change the fundamental nature of the vibrations applied. Vibrations no longer need to be fixed at discrete predetermined levels, they evolve based on parameters. Stages of vibration in this invention are no longer necessarily time based.

Often vibration characteristics and sway desired differ in the laboratory environment than those achieved outside of the laboratory when a device is used. Real world uses can be improved drastically by measuring parameters related to the vibration and sway characteristics in real time and adjusting the characteristics accordingly. This enables a device to auto adjust its characteristics to a plurality of materials, environments, habitats and locations. Adjustments may be made to increase effectiveness of the device for changing behavior/repelling pests or prevent damage to structures or plants. In extensive testing conducted monitoring sway and vibration using the invention on trees, testing indicated that a device which was mounted in a certain orientation would cause less vibration that a device mounted with another orientation or location. For example, a device mounted on the base of a tree would cause very little movement but a device mounted on a branch tip would cause extreme movement. Intelligent use of feedback from measured or calculated parameters would enable the device to adapt to those different conditions or change its function altogether. For example, a device, may sense an external vibration or other condition which would indicate a bird or animal is present and may vibrate/sway back causing the bird to move.

Often many other additional parameters have an effect on the response of a species to a stimuli and the subsequent operation of the device. It would be desirable to monitor and consider one to many other parameters to make a vibration, sway or other action more effective to a species. A device which considers other parameters would enable a device to adapt to parameters which determine the effectiveness of vibrations and sway against different species.

An example of how to use parameter feedback might include compensating/changing vibration or sway characteristics when it's warm, cold, windy, rainy, night, day sunny, cloudy etc. Any of which, under extensive observance and widespread scientific evidence, affect the responsiveness of species to stimulus such as vibration and sway.

A device may further use a date parameter to determine what part of the calendar season to vibrate. This device would then not vibrate twice or more as in some devices. It would not vibrate at all depending on the date and/or season. Many pests do not emerge until certain dates; times or until average temperatures reach certain points in certain areas of the world.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

What is claimed is:

1. An apparatus for repelling pests from an object, comprising:
    a vibration generator operable in a plurality of successive modes including a first mode with a first vibration level and a first interrupt condition and a second mode with a second vibration level and a second interrupt condition;
    an environmental sensor that senses a condition affecting the apparatus;
    a controller that receives the sensed condition and is operably connected to the vibration generator and controls the vibration generator in the first mode at the first vibration level until a monitored parameter meets the first interrupt condition, upon which the controller controls the vibration generator in the second mode at the second vibration level;
    wherein the apparatus is configured to be operably connected to the object such that vibrations from the vibration generator are transferred to the object.

2. The apparatus of claim 1, wherein when the vibration generator is operable in the first mode, the controller further controls the operation of the vibration generator in response to the sensed condition.

3. The apparatus of claim 1, wherein the controller compares the sensed condition to a predetermined threshold and adjusts the vibrations from the vibration generator based upon the comparison.

4. The apparatus of claim 3, wherein the environmental sensor is an accelerometer configured to measure the movement of the object and the predetermined threshold is a target object movement.

5. The apparatus of claim 4, wherein if the sensed condition is different than the predetermined threshold, the controller operates the vibration generator to adjust the vibrations until the target object movement is achieved.

6. The apparatus of claim 1, wherein the environmental sensor is a light sensor and the sensed condition is an amount of light, and the controller operates the vibration generator in the first mode when the sensed amount of light is a predetermined amount of light.

7. The apparatus of claim 6, wherein the controller adjusts the vibrations from the vibration generator based upon the sensed amount of light.

8. The apparatus of claim 1, wherein the environmental sensor is a temperature sensor and the sensed condition is a temperature, and the controller operates the vibration generator in the first mode when the sensed temperature is a predetermined temperature.

9. The apparatus of claim 8, wherein the controller adjusts the vibrations from the vibration generator based upon the sensed temperature.

10. A method of repelling pests from an object, the method comprising:
    securing a vibration generator to the object such that vibrations of the vibration generator are transferred to the object;
    monitoring a parameter with the controller;
    operating the vibration generator with the controller in a first mode with a first vibration level and a first interrupt condition to create at least one vibration;
    comparing the monitored parameter to the first interrupt condition;
    when the monitored parameter meets the first interrupt condition, operating the vibration generator in a second mode with a second vibration level and a second interrupt condition the controller in a standby mode; and
    upon the sensed condition meeting a predefined criteria, operating the vibration generator to create at least one vibration.

11. The method of claim 10, wherein the controller operates the vibration generator according to a predetermined operation profile, wherein the operation profile comprises a plurality of alternating vibration modes and standby modes.

12. The method of claim 10, wherein the controller operates the vibration generator to hold at each standby mode until a predetermined condition is met.

13. The method of claim 10, wherein the predetermined condition is a temporal condition.

14. The method of claim 13, wherein the predetermined condition is selected from a time, an elapsed time, or a date.

15. The method of claim 10, wherein the predetermined condition is an environmental condition.

16. The method of claim 15, the predetermined condition is selected from an acceleration, a temperature, a light amount, a humidity, or a wind speed.

17. The method of claim 10, further comprising:
    operating the vibration generator with the controller to increase or decrease the vibrations created by the vibration generator based upon the sensed condition.

18. The method of claim 10, wherein the environmental sensor is an accelerometer configured to measure a movement of the object, and further comprising:
    sensing a movement of the object;
    comparing the sensed movement of the object to a predetermined target object movement; and
    adjusting the operation of the vibration generator until the sensed movement of the object achieves the predetermined object movement.

19. The method of claim 18, wherein if the sensed movement of the object is below the predetermined target object movement, the operation of the vibration generator is adjusted to increase the vibrations and if the sensed movement of the object is above the predetermined target object movement, the operation of the vibration generator is adjusted to decrease the vibrations.

20. A method of repelling pests from an object, the method comprising:
    securing a vibration generator to the object;
    sensing an environmental condition affecting the vibration generator;
    operating the vibration generator with a controller according to a predetermined operation profile wherein the operation profile comprises a plurality of alternating vibration modes and standby modes;
    operating the vibration generator with the controller in a vibration mode to create at least one vibration;
    operating the vibration generator with the controller in a standby mode until a predetermined temporal condition is met;
    upon the sensed condition meeting a predefined criteria, operating the vibration generator to create at least one vibration.

* * * * *